United States Patent [19]

Yoshida et al.

[11] 4,285,062

[45] Aug. 18, 1981

[54] DIGITAL MULTI-LEVEL MULTI-PHASE MODULATION COMMUNICATION SYSTEM

[75] Inventors: Yasuharu Yoshida; Yoshimi Tagashira; Seijiro Yokoyama, all of Tokyo, Japan

[73] Assignee: Nippon Electric Co., Ltd., Tokyo, Japan

[21] Appl. No.: 79,725

[22] Filed: Sep. 28, 1979

[30] Foreign Application Priority Data

Oct. 3, 1978 [JP] Japan ................................. 53-122235

[51] Int. Cl.$^3$ ...................... H04L 3/00; H04L 27/18
[52] U.S. Cl. ...................................... 375/20; 375/54; 370/12
[58] Field of Search ................ 370/11, 12, 19, 20; 375/20, 39, 42, 119, 120, 111, 54, 57

[56] References Cited

U.S. PATENT DOCUMENTS

| | | | |
|---|---|---|---|
| 3,849,595 | 11/1974 | Ishiguro | 375/42 |
| 3,955,141 | 5/1976 | Lyon et al. | 375/39 |

*Primary Examiner*—Benedict V. Safourek
*Attorney, Agent, or Firm*—Sughrue, Rothwell, Mion, Zinn and Macpeak

[57] ABSTRACT

A digital multi-level multi-phase modulation system utilizes quaternary differential encoding and decoding of only the first two of N digital signal trains. A decision circuit is used to examine the frame pulses in one of the first two signal trains and in at least one of the remaining signal trains and generates output signals which can be used in a gate circuit to resolve the phase-lock ambiguity of the recovered carrier and thereby reproduce the original N signal trains.

8 Claims, 9 Drawing Figures

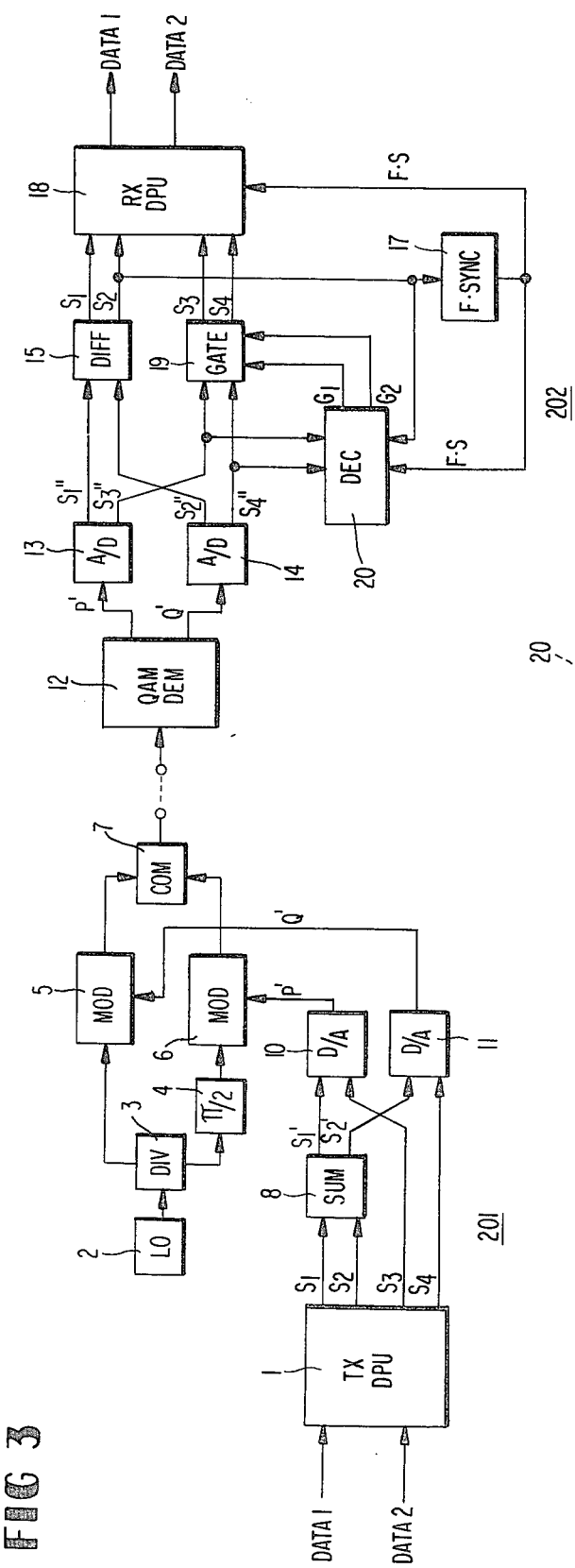
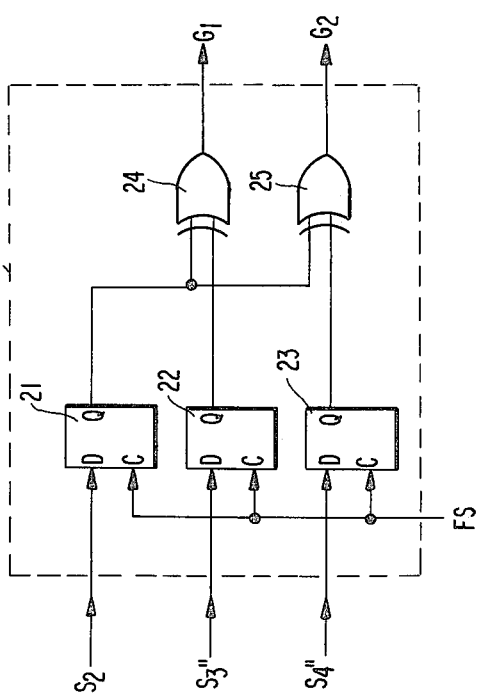
FIG 3
FIG 4

DIGITAL MULTI-LEVEL MULTI-PHASE MODULATION COMMUNICATION SYSTEM

BACKGROUND OF THE INVENTION

This invention relates to a digital multi-level multi-phase modulation communication system.

Conventionally, digital multi-level multi-phase modulation communication systems use coherent detection for phase demodulation at the receiving end because of its advantage in respect of the carrier to noise ratio (C/N ratio) required. However, due to the phase ambiguity in phase-locking that occurs during the reproduction of the reference carrier, the coherent detection system sometimes produces a demodulated pulse pattern differing from the pulse pattern supplied. To prevent this phenomenon, the prior art has used the differential encoder/decoder circuitry. For instance, according to the $2^m$-phase PSK modulation system (m is 1, 2, 3 . . . ), the pulse pattern fed is subjected to $2^m$-ary differential encoding, and the pulse train demodulated at the receiving end is subjected to $2^m$-ary differential decoding to thereby reproduce the original signal.

The 16 QAM modulation communication system is most popular as the $2^m$-phase PSK modulation system. Since the system has 12 phases, it requires theoretically duodenary differential encoding, but it actually needs only quaternary differential encoding because, in order to provide 4-level modulated signals, the phase ambiguity in phase-locking that occurs to the reference carrier reproduced must be limited to 4 phases at $\pi/2$ radians. This feature is embodied in one conventional type of 16 QAM communication system that uses two quaternary differential encoder circuits at the transmitting end and uses two quaternary differential decoder circuits at the receiving end to demodulate the received signal into the original signal. The system uses a very simple differential coding (encoding/decoding) operation, but it has a bit error rate twice as high as the other systems because all four trains of the baseband digital input signal undergo the quaternary differential encoding/decoding. For details of the above described 16 QAM communication system, reference is made to:

(1) I. Horikawa et al., "Characteristics of a High Capacity 16 QAM Digital Radio System on a Multipath Fading Channel," ICC '79 Conference Record, Volume 3 or 4, pp. 48.4.1–48.4.6, June 10–14, 1979;

(2) Japanese patent application Disclosure No. 109811/77 (disclosing the technique reported in reference (1))

SUMMARY OF THE INVENTION

Therefore, the primary object of this invention is to provide a digital multi-level multi-phase modulation/-demodulation system which is free from the above defect of the conventional system and has a low bit error rate.

This invention provides a digital multi-level multi-phase modulation communication system having a transmitting section and a receiving section: wherein the transmitting section includes first means (8) for performing quaternary differential encoding on the first two trains ($S_1$, $S_2$) of N trains (N is an integer of 4 or more) of digital signal, a frame pulse being included in (N−1) of said digital signal trains, to generate a first pair of digital signals ($S_1'$, $S_2'$); and second means (2–7, 10, 11) for generating a modulated wave by performing multi-level multi-phase modulation on the carrier with a first set of (N−2) digital signals comprising the first (N−2) trains of digital signal ($S_3$–$S_n$) the first two trains of digital signal, and with the second two trains of digital signal; and wherein the receiving section includes third means (12–14) for performing coherent detection and multi-level decision on the modulated wave to generate a second set of (N−2) digital signals ($S_3''$–$S_N''$) and a second pair of digital signals ($S_1''$, $S_2''$) corresponding to the first set of (N−2) digital signals and the first pair of digital signals, respectively, fourth means (15) for performing quaternary differential decoding on the second pair of digital signals ($S_1''$, $S_2''$) to generate the first two trains of digital signal, fifth means (17) for establishing frame synchronism by means of the output signal ($S_2$) from the fourth means, sixth means (21–23) responsive to the output of the fifth means for extracting a frame pulse corresponding to the frame pulse included in the second set of (N−2) trains of digital signal and in the output signal of the fourth means, seventh means (24, 25) responsive to the output of the sixth means for generating a control signal ($G_1$, $G_2$) representing the phase-locking state of the carrier recovered in said third means, and eighth means (19) responsive to the control signal for converting the second set of (N−2) digital signals into the same trains as the first set of (N−2) digital signals.

BRIEF DESCRIPTION OF THE DRAWINGS

This invention is now described in detail by reference to the accompanying drawings, in which:

FIG. 3 is an illustrative block diagram of the 16 QAM communication system according to this invention;

FIG. 4 is a specific circuit diagram of the decision circuit of FIG. 3;

DETAILED DESCRIPTION OF THE INVENTION

Figure 1:
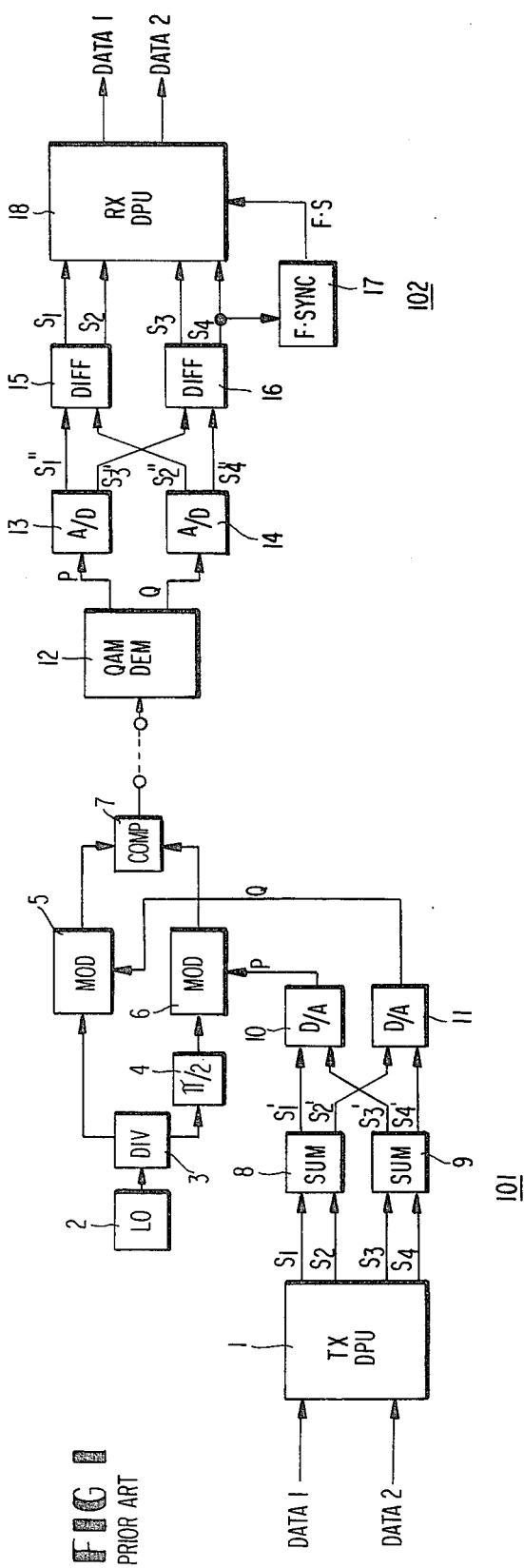
FIG. 1 is an illustrative block diagram of the conventional 16 QAM communication system.

In FIG. 1, reference numeral 101 designates a transmitting section; 102, a receiving section; 1, a transmit data processing unit; 2, a transmit local oscillator; 3, a divider; 4, a $\pi/2$ phase shifter; 5 and 6, each an amplitude modulator; 7, a combiner; 8 and 9, each a summing logic circuit; 10 and 11, each a D/A converter circuit; 12, a QAM demodulator circuit; 13 and 14, each an A/D converter circuit; 15 and 16, each a subtracting logic circuit; 17, a frame synchronizer circuit; and 18, a receive data processing unit. In the transmitting section 101, input data signals DATA 1 and 2 are supplied to the transmit data processing unit 1 where the symbol rates of DATA 1 and 2 are changed for adding frame pulses for frame synchronization, stuff pulses for providing synchronism between input signals, and pulses for order-wire channel to the DATA 1 and 2 which are then deserialized to generate four signal trains $S_1$ to $S_4$. While the above description assumes the supply of two input DATA 1 and 2, it is to be understood that any number can be selected for the number of input signal trains.

Figure 2:
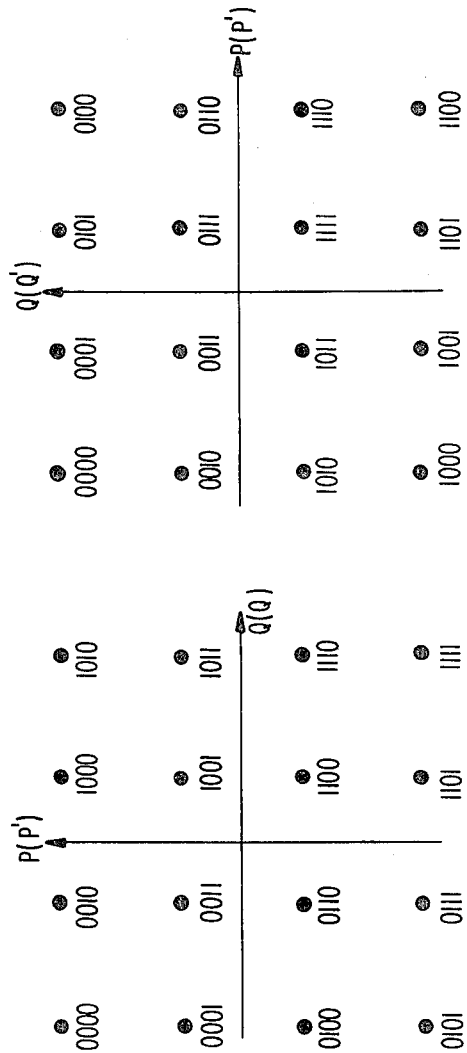
FIG. 2 is an illustrative signal vector mapping for 16 QAM.

The pair of signals $S_1$ and $S_2$ and that of $S_3$ and $S_4$ are supplied to the summing logic circuits 8 and 9, respectively, where they are subjected to quaternary differential encoding to generate a pair of signals $S_1'$ and $S_2'$ and that of $S_3'$ and $S_4'$. The signals $S_1'$ and $S_3'$ are supplied to the D/A converter circuit 10 to be converted to a 4-level signal P, and the signals $S_2'$ and $S_4'$ supplied to the D/A converter 11 to be converted to a 4-level signal Q. The signals P and Q are supplied to the amplitude modulators 5 and 6, respectively. To the other input of the modulator 5 is supplied a carrier obtained by branching in the divider 3 the carrier from the transmit local oscillator 2, and to the other input of the modulator 6 is supplied a carrier which is in quadrature with the carrier supplied to the modulator 5 and which is obtained by being passed through the $\pi/2$ phase shifter 4 downstream of the divider 3. These carriers are modulated with the signals Q and P, combined together in the combiner 7 to achieve 16 QAM as illustrated in FIG. 2, which is then supplied to the receiving section 102. In the receiving section 102, the QAM demodulator circuit 12 performs coherent detection to demodulate the 4-level signals P and Q which are fed to the A/D converter circuits 13 and 14 for 4-level decision to generate two pairs of 2-level digital signals $S_1''$ and $S_3''$ as well as $S_2''$ and $S_4''$. These signal pairs correspond to the signal pairs $S_1'$ and $S_3'$ as well as $S_2'$ and $S_4'$, respectively, generated in the transmitting section 101, but due to the phase ambiguity in phase-locking with the reference carrier recovered at the QAM demodulator circuit 12, their pattern arrays may or may not agree with digital signals $S_1''$ and $S_4'$. Therefore, the pair of signals $S_1''$ and $S_2''$ as well as the pair of signals $S_3''$ and $S_4''$ are subjected to quaternary differential decoding in the subtracting logic circuits 15 and 16, respectively, to provide signals $S_1$ to $S_4$ that agree with the signals fed $S_1$ to $S_4$. The signal $S_4$ is branched and supplied to the frame synchronizer circuit 17 (for a possible embodiment of the circuit, see U.S. Pat. No. 3,978,285) for achieving frame synchronization to reproduce a frame timing pulse FS. The signal FS is supplied to the receive data processing unit 18. In the unit 18, through the conversion process which is the reverse of the process performed in the transmit data processing unit 1, the signal FS removes from the input signals $S_1$ to $S_4$ all additional signals that have been inserted into said signals at the transmit data processing unit 1, thus reproducing signals in agreement with the original signals DATA 1 and 2. As described above, the conventional 16 QAM communication system of FIG. 1 has the two quaternary differential coding circuits at the transmitting and receiving sections, respectively. Accordingly, a error rate in this system is about twice as high as that in the system without any differential coding circuit.

FIG. 3 is one embodiment of the 16 QAM communication system according to this invention which is free from the above described defect of the conventional system: In FIG. 3, a transmitting section is generally indicated at 201, and a receiving section at 202; 19 is a gate circuit and 20 is a decision circuit. In FIG. 3, like numbers identify like components of FIG. 1. Referring now to the transmitting section 201, signals $S_1$ to $S_4$ are produced in the transmit data processing unit 1. Signals $S_1$, $S_3$ and $S_4$ or signals $S_2$, $S_3$ and $S_4$ have a frame pulse inserted therein. The following description assumes that the frame pulse is not inserted in signal $S_1$, that is, the pulse is inserted in signals $S_2$, $S_3$ and $S_4$ (the frame pulse train is hereinafter referred to as signal M). The signals $S_1$ and $S_2$ are supplied to the summing logic circuit 8 where they are subjected to quaternary differential encoding to generate signals $S_1'$ and $S_2'$. The signals $S_3$ and $S_4$ are not subjected to the differential encoding. The pair of signals $S_1'$ and $S_3$ and that of $S_2'$ and $S_4$ are supplied to the D/A converters 10 and 11, respectively. The D/A converter 10 generates a 4-level signal P', and the D/A converter 11 a 4-level signal Q'. The signals Q' and P' are supplied to the amplitude modulators 5 and 6 where the signals modulate carriers which are in quadrature with each other as described above. The combiner 7 combines the modulated carriers and, as described above, produces 16 QAM vector signals as illustrated in FIG. 2.

Referring now to the receiving section 202, the 4-level signals P' and Q' demodulated in the QAM demodulator 12 are supplied to the A/D converter circuits 13 and 14, respectively, which perform 4-level decision to generate a pair of signals $S_1''$ and $S_3''$ and that of signals $S_2''$ and $S_4''$. The signals $S_1''$ and $S_2''$ that correspond to the signals $S_1$ and $S_2$ are supplied to the subtracting logic circuit 15 where they are subjected to quaternary differential decoding to reproduce signals that agree with the signals $S_1$ and $S_2$. The signal $S_2$ is branched into two, one of which is supplied to the frame synchronizer circuit 17 to establish frame synchronization for reproduction of the frame timing signal FS. The signals $S_3''$, $S_4''$, $S_2$ and FS are supplied to a decision circuit 20 which generates decision signals $G_1$ and $G_2$ representing phase-locking state of the carrier recovered in the QAM demodulator circuit 12. The decision signals $G_1$ and $G_2$ are supplied to the gate circuit 19. The gate circuit 19 uses the decision signals $G_1$ and $G_2$ to control the input signals $S_3''$ and $S_4''$ so that they agree with the signals $S_3$ and $S_4$ regardless of the phase-locking state of the recovered carrier in the QAM demodulator circuit 12, and as a result the circuit 19 generates signals $S_3$ and $S_4$. The thus reproduced signals $S_1$ to $S_4$ are supplied to the receive data processing unit 18 which is responsive to the signal FS to produce signals DATA 1 and 2 by removing the additional bits inserted in the original signals in the transmit data processing unit 1.

Figure 5:
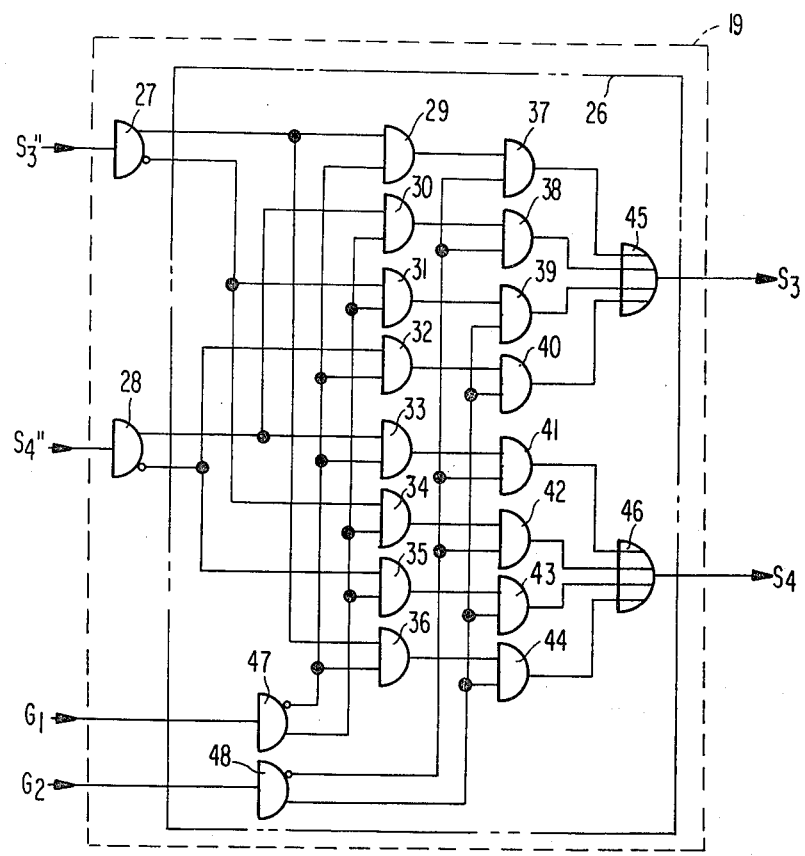
FIG. 5 is a specific circuit diagram of the gate circuit of FIG. 3.

The decision circuit 20 and gate circuit 19 of FIG. 3 are hereinafter described by reference to FIGS. 4 and 5 which illustrate an embodiment of the decision circuit and gate circuit, respectively, wherein reference numerals 21 to 23 designate D-type flip-flops; 24 and 25, Exclusive-OR (EX-OR) gates; 26, a channel selector; 27, 28 47 and 48, OR/NOR gates; 29 to 44, AND gates; and 45 and 46, OR gates.

Referring to FIG. 4, signals $S_2$, $S_3''$ and $S_4''$ are supplied to the D-type flip-flops 21 to 23, respectively, where they are sampled with the frame timing pulse FS, and as a result, the frame pulse M is extracted from each signal. Table 1a below shows the change in the signals $S_3''$ and $S_4''$ depending on the phase-locking state of the recovered carrier at the QAM demodulator 12. Table 1b shows the condition of the frame pulse M extracted from the signals $S_3''$ and $S_4''$, following the change indicated in Table 1a. The outputs of the flip-flops 21 and 23 are supplied to the Exclusive-OR gates 24 and 25 where an Exclusive-OR operation is applied to the outputs to generate decision signals $G_1$ and $G_2$, respectively, as identified in Table 1c below.

TABLE 1

| Locked Phase | a | | b | | c | | |
|---|---|---|---|---|---|---|---|
| | $S_3''$ | $S_4''$ | $S_3''$ | $S_4''$ | $S_2$ | $G_1$ | $G_2$ |
| 1 | $S_3$ | $S_4$ | M | M | M | 0 | 0 |
| 2 | $\bar{S}_4$ | $S_3$ | $\bar{M}$ | M | M | 1 | 0 |
| 3 | $\bar{S}_3$ | $\bar{S}_4$ | M | M | M | 1 | 1 |
| 4 | $S_4$ | $\bar{S}_3$ | $\bar{M}$ | $\bar{M}$ | M | 0 | 1 |

The gate circuit 19 is such that is satisfies the relationships defined in Table 1a, 1b and 1c.

TABLE 2

| Locked Phase | $S_3$ | $S_4$ | $G_1$ | $G_2$ |
|---|---|---|---|---|
| 1 | $S_3''$ | $S_4''$ | 0 | 0 |
| 2 | $S_4''$ | $\bar{S}_3''$ | 1 | 0 |
| 3 | $\bar{S}_3''$ | $\bar{S}_4''$ | 1 | 1 |
| 4 | $\bar{S}_4''$ | $S_3''$ | 0 | 1 |

Figure 6:
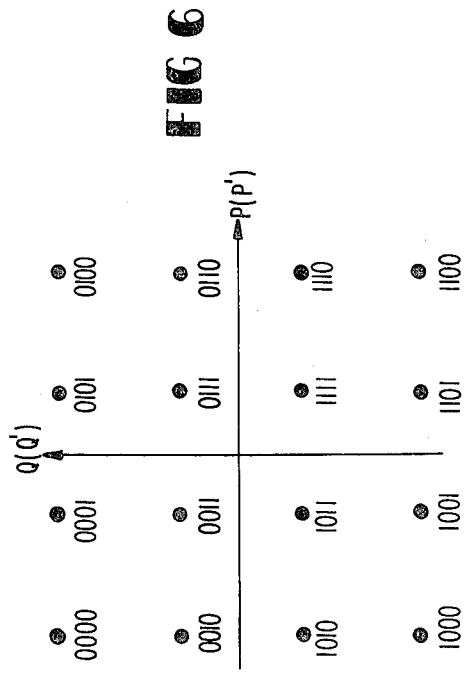
FIG. 6 is an illustrative signal vector mapping for 16 QAM of this invention.

Table 2 is equivalent to Table 1a and 1c except that the change in the signals $S_3$ and $S_4$ is indicated. FIG. 5 is an illustrative circuit diagram embodying the relationships indicated in Table 2. It is to be noted that the size of the channel selector 26 of FIG. 5 can be reduced noticeably by using a commercially available integrated circuit containing 2 or 3 selectors in one package. The foregoing description concerns one embodiment of this invention as applied to the modulated signal vector mapping of FIG. 2, and a slight modification becomes necessary with a different modulated signal vector mapping. Therefore, another embodiment of this invention is now described in connection with its application to the modulated signal vector mapping of FIG. 6. Table 3a below shows the change in signals $S_3''$ and $S_4''$ depending on the phase-locking state at the QAM modulator 12. Let it be assumed that frame pulses M of opposite polarities are inserted in the $S_3$ and $S_4$ fed (M for $S_3$, and $\bar{M}$ for $S_4$). Frame pulses as indicated in Table 3b are extracted from the signals $S_3''$ and $S_4''$. Therefore, if the frame pulse extracted from one of the signals $S_3''$ and $S_4''$ ($S_3''$ for the purpose of the present description) and that from the signal $S_2$ are supplied to an Exclusive-OR gate, and the circuit produces at the output a decision signal $G_3$ as indicated in Table 3c.

TABLE 3

| Locked Phase | a | | b | | c | |
|---|---|---|---|---|---|---|
| | $S_3''$ | $S_4''$ | $S_3''$ | $S_4''$ | $S_2$ | $G_3$ |
| 1 | $S_3$ | $S_4$ | M | $\bar{M}$ | M | 0 |
| 2 | $S_4$ | $S_3$ | $\bar{M}$ | M | M | 1 |
| 3 | $S_3$ | $S_4$ | M | $\bar{M}$ | M | 0 |
| 4 | $S_4$ | $S_3$ | $\bar{M}$ | M | M | 1 |

Figure 7:
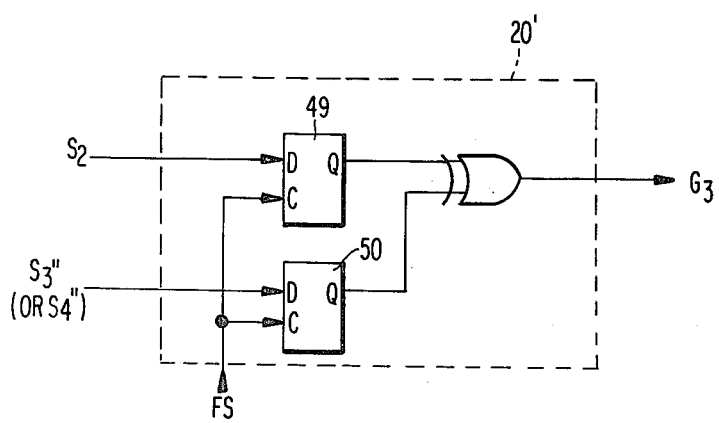
FIG. 7 is another specific circuit diagram of the decision circuit of FIG. 3.
Figure 8:
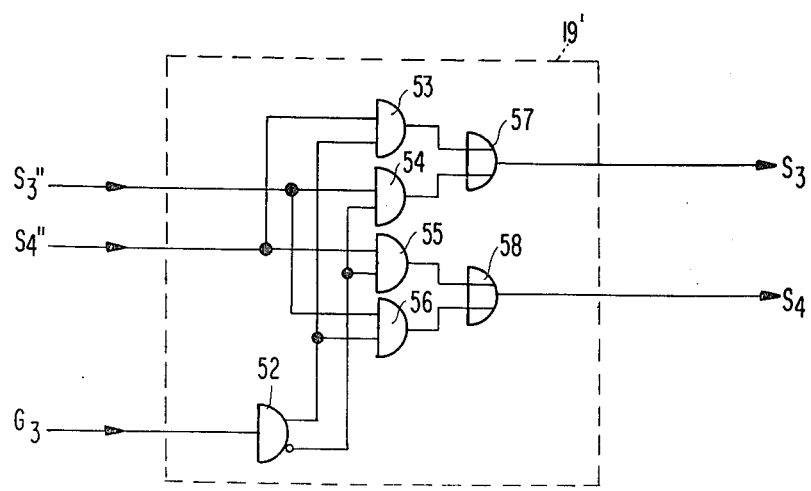
FIG. 8 is another specific circuit diagram of the gate circuit of FIG. 3.

FIG. 7 is circuit diagram of the decision circuit 20' that embodies the relationships indicated in Table 3. In the Figure, reference numerals 49 and 50 designate D-type flip-flops; and 51, an Exclusive-OR gate. The gate circuit 19' is such that it satisfies the relationships defined in Tables 3a and 3c. Table 4 below is the equivalent of Table 3a and 3c except that the change in signals $S_3$ and $S_4$ is shown. FIG. 8 is a circuit diagram of the gate circuit 19' that embodies the relationships indicated in Table 4; in the Figure, reference numeral 52 designates an OR/NOR gate, 53 to 56, AND gates; 57 and 58, OR gates.

TABLE 4

| Locked Phase | $S_3$ | $S_4$ | $G_3$ |
|---|---|---|---|
| 1 | $S_3''$ | $S_4''$ | 0 |
| 2 | $S_4''$ | $S_3''$ | 1 |
| 3 | $S_3''$ | $S_4''$ | 0 |
| 4 | $S_4''$ | $S_3''$ | 1 |

Figure 9:
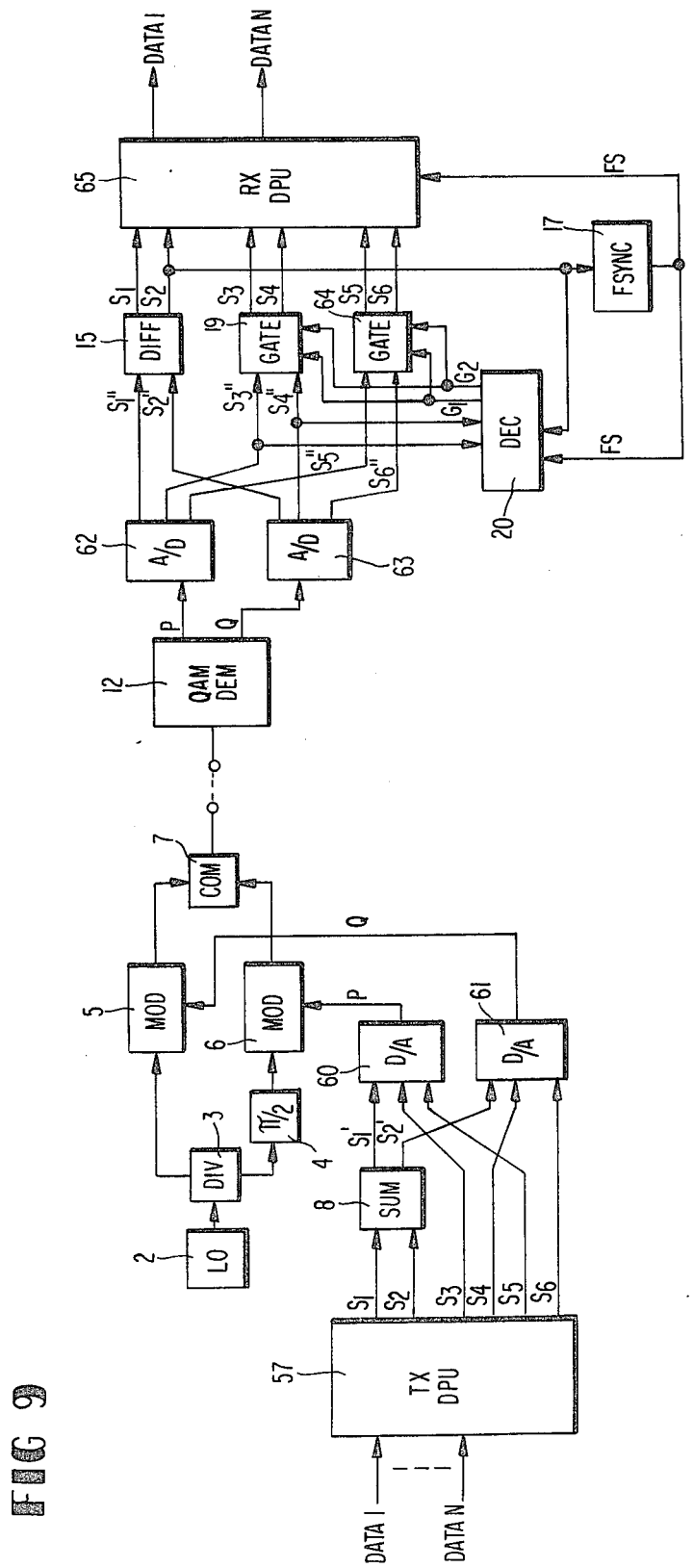
FIG. 9 is an illustrative block diagram of a 64 (8×8) QAM communication system according to this invention.

FIG. 9 is an embodiment of this invention as applied to the 8×8 QAM system, wherein: reference numeral 59 denotes a transmit data processing unit; 60 and 61, each a 2-level to 8-level converter circuit; 62 and 63, each an 8-level to 2-level converter circuit; 64, a gate circuit the same as the circuit 19; and 65, a receive data processing unit. The intended object of the invention can be achieved simply by adding the gate circuit 64 to the circuit components of FIG. 3, except that the 2-level/4-level D/A and A/D converter circuits of FIG. 3 are replaced by 2-level/8-level D/A and A/D converters. It is to be understood that the same circuit configuration can be applied to the 8×4 QAM system except that either signal $S_5$ or $S_6$ is deleted at the transmitting end.

As described in the foregoing, the system of this invention performs quaternary differential encoding/decoding on signals $S_1$ and $S_2$, but no such encoding/decoding need be applied to signals $S_3$, $S_4$ and higher-order signals. Therefore, the system is not only free from the potential increase in the bit error rate but it can be implemented with a simple circuit configuration. In addition, as will be readily understood from the description hereinabove, the system of this invention can be applied to $2^l \times 2^k$ QAM (wherein $l=2, 3, 4 \ldots$; $k=2, 3, 4 \ldots$) system.

What we claim is:

1. A digital multi-level multi-phase modulation communication system having a transmitting section and a receiving section, wherein said transmitting section includes:

first means for performing quarternary differential encoding on the first two trains of N digital signal trains (N is an integer of 4 or more), a frame pulse being included in at least three of said N digital signal trains, to generate a first pair of digital signals; and second means for generating a modulated wave by performing multi-level multi-phase modulation on a carrier with a first set of digital signals comprising the remaining (n−2) trains of said N digital signal trains and said first pair of digital signals; and wherein said receiving section includes:

third means for performing coherent detection and multi-level decision on said modulated wave to recover said carrier and generate a second set of digital signals and a second pair of digital signals corresponding to said remaining (N−2) trains of said N digital signal trains and said first pair of digital signals respectively;

fourth means for performing quaternary differential decoding on said second pair of digital signals to generate said first two trains of digital signal;

fifth means for generating a frame synchronization output signal and establishing frame synchronism by means of the output signal from said fourth means;

sixth means responsive to the output of said fifth means for extracting frame pulses corresponding to said frame pulses included in said remaining (N−2)

trains of said N digital signal trains and in the output signal of said fourth means;

seventh means responsive to the output of said sixth means for generating a control signal representing the phase-locking state of the carrier recovered in said third means; and eighth means responsive to said control signal for converting said second set of digital signals into the same trains as said remaining $(N-2)$ trains of said N digital signal trains.

2. A communication system as defined in claim 1, wherein said sixth means comprises:

first flip-flop means receiving as an input signal an output from said fourth means corresponding to one of said first two signal trains having a frame pulse included therein; and second flip-flop means receiving as an input at least one of said second set of $(N-2)$ digital signals having a frame pulse included therein, said first and second flip-flop means being clocked by said frame synchronization output signal, and the outputs of said first and second flip-flop means comprising said extracted frame pulse.

3. A communication system as defined in claim 2, wherein said second flip-flop means comprises two flip-flops each of which receives as an input a different one of said second set of $(N-2)$ digital signals.

4. A communication system as defined in claim 2, wherein said remaining $(N-2)$ trains of said N digital signal trains comprise third and fourth digital signal trains, wherein the frame pulses included in said third and fourth digital signal trains are of opposite polarity, and wherein said second flip-flop means consists of a single flip-flop receiving as an input one of said second set of $(N-2)$ digital signals corresponding to one of said third and fourth signal trains.

5. A communication system as defined in claim 2, wherein said seventh means comprises Exclusive-OR logic means for receiving and combining the outputs of said first and second flip-flop means, the output of said Exclusive-OR logic means comprising said control signal.

6. A communication system as defined in claim 3, wherein said seventh means comprises two Exclusive-OR logic gates each of which receives as one input the output from said first flip-flop means, the other input to each said Exclusive-OR gate being provided by an output from a respective one of said two flip-flops comprising said second flip-flop means.

7. A communication system as defined in claim 6, wherein said eighth means comprises:

a plurality of OR/NOR gates, at least two of said OR/NOR gates receiving the outputs from said Exclusive-OR gates and the remaining OR/NOR gates receiving as input signals different ones of said second set of $(N-2)$ digital signals;

a plurality of AND gates for receiving and combining selected outputs from said OR/NOR gates; and at least first and second OR gates for receiving and combining outputs from selected AND gates, the outputs from said OR gates comprising the same signal trains as said remaining $(N-2)$ trains of said N digital signal trains.

8. A communication system as defined in claim 5, wherein said eighth means comprises:

OR/NOR logic means for receiving the output from said Exclusive-OR logic means and for providing a plurality of output signals;

a plurality of AND gates for separately combining each output from said OR/NOR logic means with each of said second set of $(N-2)$ digital signals; and $(N-2)$ OR gates for receiving and combining selected outputs from said AND gates, the output from each of said OR gates corresponding to a different one of said remaining $(N-2)$ trains of said N digital signal trains.

* * * * *

UNITED STATES PATENT AND TRADEMARK OFFICE
CERTIFICATE OF CORRECTION

PATENT NO. : 4,285,062
DATED : August 18, 1981
INVENTOR(S) : Yasuharu YOSHIDA et al.

It is certified that error appears in the above—identified patent and that said Letters Patent is hereby corrected as shown below:

Column 2, line 2, before "the" insert -- after -- .

Column 4, line 56, after "28" insert -- , -- .

Column 5, Table 1, under heading "b", locked phase 3, should read -- $\bar{M}$  $\bar{M}$  M -- ;

under heading "b", locked phase 4, should read -- M  $\bar{M}$  M -- .

line 40, delete "fed" and insert -- signals -- .

Signed and Sealed this

Eighth Day of December 1981

[SEAL]

Attest:

GERALD J. MOSSINGHOFF

Attesting Officer   Commissioner of Patents and Trademarks